United States Patent
Etori et al.

(10) Patent No.: US 8,372,505 B2
(45) Date of Patent: Feb. 12, 2013

(54) ANTI-GLARE MEMBER, DISPLAY AND SCREEN USING THE SAME

(75) Inventors: Hideki Etori, Saitama (JP); Takayuki Aikawa, Saitama (JP); Takehiro Sasaki, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 705 days.

(21) Appl. No.: 12/376,762

(22) PCT Filed: Aug. 1, 2007

(86) PCT No.: PCT/JP2007/065059
§ 371 (c)(1),
(2), (4) Date: Feb. 6, 2009

(87) PCT Pub. No.: WO2008/018339
PCT Pub. Date: Feb. 14, 2008

(65) Prior Publication Data
US 2010/0189956 A1    Jul. 29, 2010

(30) Foreign Application Priority Data
Aug. 9, 2006  (JP) .................................. 2006-216527

(51) Int. Cl.
*D06N 7/04*    (2006.01)
*D06N 7/00*    (2006.01)

(52) U.S. Cl. .................. 428/147; 428/141; 428/143

(58) Field of Classification Search .................. 428/141, 428/143, 147, 212, 357, 402, 403, 407
See application file for complete search history.

(56) References Cited

U.S. PATENT DOCUMENTS

| | | | | |
|---|---|---|---|---|
| 6,419,366 B1 * | 7/2002 | Namioka | ........................ | 359/601 |
| 2004/0160669 A1 * | 8/2004 | Osawa et al. | ................. | 359/460 |
| 2005/0168800 A1 * | 8/2005 | Hiraoka et al. | ............... | 359/296 |
| 2006/0153979 A1 * | 7/2006 | Asakura et al. | ............... | 427/164 |

FOREIGN PATENT DOCUMENTS

| | | |
|---|---|---|
| JP | 07-281004 | 10/1995 |
| JP | 07-290652 | 11/1995 |
| JP | 08-054502 | 2/1996 |
| JP | 2002-365731 | 12/2002 |
| JP | 2003-301141 | 10/2003 |
| JP | 2004-046258 | 2/2004 |

\* cited by examiner

*Primary Examiner* — Maria Veronica Ewald
*Assistant Examiner* — Nancy Rosenberg
(74) *Attorney, Agent, or Firm* — Bacon & Thomas, PLLC

(57) ABSTRACT

An anti-glare member prevents reflection of external light by surfaces of displays or screens without causing reduction of contrast and glare of displayed images. The anti-glare member has an anti-glare layer comprising microparticles and a transparent binder wherein the microparticles are black microparticles having a value (n), obtained by dividing absolute value of complex index of refraction of the black microparticles by index of refraction of the transparent binder, of 0.95 to 1.05. The arithmetical mean roughness (Ra) according to JIS B0601:2001 of surface of the anti-glare layer is 0.3 to 1.0 μm.

9 Claims, 1 Drawing Sheet

ANTI-GLARE MEMBER, DISPLAY AND SCREEN USING THE SAME

TECHNICAL FIELD

The present invention relates to an anti-glare member which is disposed on surfaces of various displays such as liquid crystal displays (LCD) and plasma displays (PDP), and various screens such as transmission screens and reflective screens to prevent reflection of external lights by surfaces of these displays or screens.

BACKGROUND ART

If lights of interior illuminations such as fluorescent lights are reflected by surfaces of displays such as LCDs and various screens, displayed images become hard to see, and display quality is degraded.

Therefore, a matted anti-glare layer is provided on surfaces of displays or screens. The mainstream of the method for forming such an anti-glare layer is constituted by methods of coating a resin containing dispersed microparticles and drying the resin to form a coated layer, since structure can be easily made finer and good productivity can be attained by such methods (Patent document 1).

Patent document 1: Japanese Patent Unexamined Publication (KOKAI) No. 2004-46258 (claims)

DISCLOSURE OF THE INVENTION

Object to be Achieved by the Invention

However, those methods still have problems, for example, the anti-glare layer is whitely observed due to light scattering generated by unevenness on the surface of the anti-glare layer, which results in reduction of contrast of displayed images, and unevenness on the surface of the anti-glare layer functions as a lens, which results in glare of displayed images.

The present invention was accomplished in view of the situation explained above, and aims at providing an anti-glare member which can prevent reflection of external lights by surfaces of displays or screens without reduction of contrast and glare of displayed images.

Means for Achieving the Object

The anti-glare member of the present invention, which achieves the aforementioned object, is an anti-glare member having an anti-glare layer comprising microparticles and a transparent binder, wherein the microparticles are black microparticles, a value (n) obtained by dividing absolute value of complex index of refraction of the black microparticles by index of refraction of the transparent binder is 0.95 to 1.05, and arithmetical mean roughness (Ra) according to JIS B0601:2001 of surface of the anti-glare layer is 0.3 to 1.0 µm.

In the anti-glare member of the present invention, the black microparticles preferably have a mean particle diameter of 1.0 to 6.0 µm.

In the anti-glare member of the present invention, a value (S) obtained by dividing absorption cross section of the black microparticles by scattering cross section of the same is preferably 1.1 to 5.0.

In the anti-glare member of the present invention, the black microparticles may comprises at least a black pigment and a resin, and the black pigment may be contained at a ratio of 2 to 20% by weight based on the black microparticles.

In the anti-glare member of the present invention, the black microparticles may comprise at least a black pigment, and carbon black may be used as the black pigment.

The display of the present invention is a display having the anti-glare member of the present invention on a surface of the display.

The screen of the present invention is a screen having the anti-glare member of the present invention on a surface of the screen.

The mean particle diameter referred to in the present invention means a value calculated by the Coulter counter method.

Effect of the Invention

The anti-glare member of the present invention contains black microparticles in an anti-glare layer, and the value (n) obtained by dividing absolute value of complex index of refraction of the black microparticles by index of refraction of the transparent binder and arithmetical mean roughness (Ra) of surface of the anti-glare layer are made to be within the specific ranges. Reflection of external lights by surfaces of displays or screens can be thereby prevented without reduction of contrast or glare of displayed images.

BEST MODE FOR CARRYING OUT THE INVENTION

Embodiments of the anti-glare member of the present invention will be explained first. The anti-glare member of the present invention is an anti-glare member having an anti-glare layer comprising microparticles and a transparent binder, wherein the microparticles are black microparticles, a value (n) obtained by dividing absolute value of complex index of refraction of the black microparticles by index of refraction of the transparent binder is 0.95 to 1.05, and arithmetical mean roughness (Ra) according to JIS B0601:2001 of surface of the anti-glare layer is 0.3 to 1.0 µm.

FIGS. 1 and 2 are sectional views showing an embodiment of the anti-glare member 1 of the present invention. The anti-glare member of this embodiment includes one consisting of an anti-glare layer 11 alone as shown in FIG. 1, and one consisting of a transparent support 12 and an anti-glare layer 11 as shown in FIG. 2. Such an anti-glare member 1 is disposed on a display 2 or a screen 2 as shown in FIG. 3 for use.

The anti-glare member 1 of this embodiment has an anti-glare layer comprising microparticles and a transparent binder, and black microparticles are used as the microparticles. Further, the value (n) obtained by dividing absolute value of complex index of refraction of the black microparticles by index of refraction of the transparent binder is controlled to be 0.95 to 1.05, and arithmetical mean roughness (Ra) according to JIS B0601:2001 of surface of the anti-glare layer is controlled to be 0.3 to 1.0 µm. By these characteristics, the anti-glare member 1 of this embodiment can prevent reflection of external lights by surfaces of displays or screens without reduction of contrast and glare of displayed images.

The black microparticles mainly affect contrast and glare of displayed images, and reflection of external lights.

When an anti-glare layer which generally comprises microparticles is provided, backward scattering lights usually increase with increase of haze, and brightness of portions to be originally darkly displayed increases to reduce contrast of displayed images. However, in this embodiment, the anti-glare layer is formed by using black microparticles as the microparticles, therefore increase in backward scattering lights can be suppressed, and reduction of contrast can be prevented. Further, since the anti-glare layer becomes black, the darkly displayed portions becomes further darker, and contrast can be thereby increased on the contrary. Moreover, if the anti-glare layer itself is colored black with a black dye or the like, light transmission of the anti-glare layer itself decreases uniformly, so that displayed images become darker, or screen gain (SG value) is degraded. However, if black microparticles are used as in this embodiment, portions where the microparticles do not exist are not colored in a microscopic sense, therefore light transmission of these portions does not decrease, and brightness and SG value of displayed images can be made unlikely to decrease.

The value obtained by dividing absolute value of complex index of refraction of the black microparticles by index of refraction of the transparent binder (henceforth also referred to simply as "n") mainly affects glare of displayed images. By adjusting n to be 0.95 to 1.05, glare of displayed images can be prevented.

Arithmetical mean roughness of surface of the anti-glare layer according to JIS B0601:2001 (henceforth also referred to simply as "Ra") mainly affects reflection of external lights and contrast of displayed images. By using black microparticles, adjusting n to be within the aforementioned range, and adjusting Ra to be 0.3 to 1.0 μm, reflection of external lights can be prevented, and contrast of displayed images can be made favorable. Ra is more preferably adjusted to be 0.4 to 0.8 μm. Ra can be suitably adjusted by adjusting mean particle diameter and addition amount of the black microparticles.

The mean particle diameter of the black microparticles is preferably 1.0 to 6.0 μm, more preferably 2.0 to 5.0 μm. With a mean particle diameter of 1.0 μm or larger, it becomes easy to impart surface unevenness to the anti-glare layer, and therefore sufficient anti-glare property can be obtained. With a mean particle diameter of 6.0 μm or smaller, glare of displayed images due to scattered lights generated by the lens-like function of unevenness formed by the microparticles can be prevented.

The value obtained by dividing absorption cross section of the black microparticles by scattering cross section of the same (henceforth also referred to simply as "S") is preferably 1.1 to 5.0, more preferably 1.3 to 2.0. The scattering cross section used herein represents degree of scattering of light caused by the particles, and the absorption cross section used herein represents degree of absorption of light by the particles. Therefore, S is an index which represents ratio of light absorption amount and light scattering amount of the black microparticles, and by adjusting this value, the absorption coefficient which represents light absorption property and light scattering property of the black microparticles can be controlled. With S of 1.1 or larger, sufficient light absorption property of the black microparticles can be obtained, and thus reduction of contrast can be prevented. With S of 5.0 or smaller, light scattering by the black microparticles is suppressed, and glare of displayed images can be thereby prevented. This value can be controlled by adjusting complex index of refraction of the black microparticles, mean particle diameter of the black microparticles and index of refraction of the transparent binder.

Scattering cross section Qs and absorption cross section Qa of one black microparticle can be obtained according to the following equations (1) and (2), wherein ns represents complex index of refraction of the black microparticle (=m+ki, k is extinction coefficient), D represents particle diameter, nm represents index of refraction of the transparent binder, and λ represents wavelength of incident light.

[Equation 1]
$$Qs = \frac{\lambda^2}{2\pi n_m^2} \sum_{j=1}^{\infty} (2j+1)(|A_j|^2 + |B_j|^2) \quad (1)$$

[Equation 2]
$$Qa = \frac{\lambda^2}{2\pi n_m^2} R\left\{\sum_{j=1}^{\infty} (2j+1)(A_j + B_j)\right\} - Qs \quad (2)$$

In the equations, R represents real number portion in the parentheses { }, and $A_j$ and $B_j$ are represented by the following equations (3) and (4).

[Equation 3]
$$A_j = \frac{n_{sm}\psi'_j(q)\psi_j(n_{sm}q) - \psi_j(q)\psi'_j(n_{sm}q)}{n_{sm}\zeta'_j(q)\psi_j(n_{sm}q) - \zeta_j(q)\psi'_j(n_{sm}q)} \quad (3)$$

[Equation 4]
$$B_j = \frac{n_{sm}\psi_j(q)\psi'_j(n_{sm}q) - \psi'_j(q)\psi_j(n_{sm}q)}{n_{sm}\zeta_j(q)\psi'_j(n_{sm}q) - \zeta'_j(q)\psi_j(n_{sm}q)} \quad (4)$$

In the equations (3) and (4), q, $n_{sm}$, $\psi_j$, and $\zeta_j$ are represented by the following equations (5), (6), (7) and (8) as follows.

[Equation 5]
$$q = \frac{n_m \pi D}{\lambda} \quad (5)$$

[Equation 6]
$$n_{sm} = \frac{n_s}{n_m} \quad (6)$$

[Equation 7]
$$\psi_j(z) = \sqrt{\frac{\pi z}{2}} J_{j+1/2}(z) \quad (7)$$

[Equation 8]
$$\zeta_j(z) = \psi_j(z) + i\sqrt{\frac{\pi z}{2}} Y_{j+1/2}(z) \quad (8)$$

Moreover, $\psi_j'$ (z) and $\zeta_j'$ (z) in the equations (3) and (4) represent differentials of $\psi_j(z)$ and $\zeta_j(z)$ with z, respectively, and $J_{j+1/2}(z)$ in the equation (7) and $Y_{j+1/2}(z)$ in the equation (8) are Bessel functions of the first kind and the second kind, respectively. In the case of black microparticles having particle size distribution, the particle size D can be represented by the mean particle diameter thereof.

Content of the black microparticles in the anti-glare layer is preferably 20 to 100 parts by weight with respect to 100 parts by weight of the transparent binder. With a content in such a range, it can be made easy to control Ra of the surface of the anti-glare layer to be within the aforementioned range.

Examples of the black microparticles include black pigments such as carbon black and iron oxide as well as black resin microparticles colored with the foregoing black pigments. Among these, black resin microparticles are preferred, of which mean particle diameter can be easily controlled to be within the aforementioned range and complex index of refraction can be easily controlled. As the black pigment, carbon black is preferred.

The black resin microparticles consist of a black pigment and a resin. As the black pigment to be used, carbon black is preferred, which shows superior handling property. Examples of the resin include acrylic resins, polystyrene resins, polyurethane resins, benzoguanamine resins, silicone resins, and so forth. Among these, acrylic resins are preferred, which show superior transparency.

The complex index of refraction of the black resin microparticles is obtained as a weight average of the index of refraction of the resin which constitutes the microparticles and the complex index of refraction of the black pigment which constitutes the microparticles. Specifically, it can be obtained as a sum of the product of the index of refraction of the resin which constitutes microparticles and the weight ratio of the resin in the microparticles and the product of the complex index of refraction of the black pigment which constitutes microparticles and the weight ratio of the black pigment in the microparticles. When the black microparticles consists of a black pigment alone, the complex index of refraction of the black microparticles is the complex index of refraction of the black pigment.

The ratio of the black pigment in the black resin microparticles is preferably 2 to 20% by weight, more preferably 5 to 15% by weight. With the ratio of 2% by weight or higher, sufficient light absorption property of the microparticles can be obtained, and S can be made 1.1 or larger, and with the ratio of 20% by weight or lower, a moderate absorption coefficient can be obtained, and the range of particle diameter giving S of 5.0 or smaller can be made wider.

The black resin microparticles can be produced, for example, as follows. First, a black pigment is mixed with polymerizable monomers such as polyfunctional vinyl monomers and monofunctional vinyl monomers, and this mixture is uniformly kneaded by a roll mill or sand mill. Then, a hydrophilic solvent and a radical polymerization initiator are added to the mixture to decrease the viscosity. Subsequently, a separately prepared solution consisting of a protective colloid agent and water is added. Then, the mixture is stirred with a high-speed stirrer showing high shearing force until an intended particle diameter is obtained. Subsequently, the content is transferred to a container provided with a common vaned stirrer, heated to remove a part of the solvent, and further heated to complete the polymerization reaction. Then, the slurry suspending the polymerization product can be filtered, and the residue can be washed with water and dried to obtain black resin microparticles.

The transparent binder of the anti-glare layer may be one that is transparent and can uniformly retain the microparticles in a dispersed state, and examples include solids such as glass and polymer resins. However, in view of handling property, stability of the dispersed state, and so forth, polymer resins are preferred.

Glass is not particularly limited so long as the light transmission property of the anti-glare layer is not lost. Examples of glass generally used include oxide glass such as silicate glass, phosphate glass and borate glass, and so forth. As the polymer resins, thermoplastic resins, thermosetting resins, ionizing radiation hardening resins, such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins, and so forth can be used.

Although thickness of the anti-glare layer is not particularly limited, it is preferably 1 to 10 µm.

The anti-glare layer is formed on a transparent support if needed. Although the transparent support is not particularly limited, plastic films comprising polyester resin, polycarbonate resin, polyvinyl chloride resin, polyethylene resin, polypropylene resin, polystyrene resin, or the like, glass, and so forth can be used. Although the thickness of the support is not particularly limited, it is usually about 10 to 250 µm.

To the anti-glare layer, leveling agents, ultraviolet absorbers, anti-oxidants, and other additives may be added. Moreover, microparticles other than black microparticles may also be added.

Examples of the method for forming the anti-glare layer include a method of preparing a coating solution by dissolving or dispersing ingredients of the anti-glare layer in a suitable solvent, applying the coating solution on a transparent support by a known method such as roll coating, bar coating, spray coating and air knife coating, and drying the coating solution, a method of melting a resin component constituting the anti-glare layer, adding additives such as a pigment to the melted resin as required, and forming a sheet from the mixture, and to forth. Moreover, the anti-glare layer may be directly formed on a surface of a display or screen by the aforementioned methods.

An antistatic layer may be provided on the anti-glare layer or the surface of the transparent support on the side opposite to the anti-glare layer side in order to prevent electrification, and a back coat layer may be provided on the surface of the transparent support on the side opposite to the anti-glare layer side in order to prevent generation of curl.

Moreover, the anti-glare member of the present invention mentioned above may have an adhesive layer for adhering the member to a display or screen. Furthermore, on the anti-glare layer, an anti-reflection layer may be provided in a shape following the surface profile of the anti-glare layer.

Hereafter, an embodiment of the display of the present invention will be explained. The display of the present invention comprises a display and the aforementioned anti-glare member of the present invention provided on a surface of the display.

Examples of the display include conventionally known displays such as liquid crystal displays (LCD), cathode ray tube displays (CRT), plasma displays (PDP) and organic EL displays.

The display of this embodiment comprises a display 2 such as LCD and the aforementioned anti-glare member 1 of the present invention provided on a surface of the display 2 as shown in FIG. 3. The display of this embodiment does not suffer from reflection of external lights by the display surface, reduction of contrast and glare of displayed images.

For providing the anti-glare member on the surface of display, for example, parts or whole surfaces of both the members may be adhered together with an adhesive, or both the members may be fixed with a frame. However, in order not to form an air layer between the anti-glare member and the display surface, the whole surface of the anti-glare member is preferably adhered on the display surface using an adhesive or the like.

Hereafter, an embodiment of the screen of the present invention will be explained. The screen of the present invention comprises a screen and the aforementioned anti-glare member of the present invention provided on a surface of the screen.

Examples of the screen include conventionally known screens such as reflective screens and transmission screens.

The screen of this embodiment comprises a screen 2 such as reflective screen and the aforementioned anti-glare member 1 of the present invention provided on a surface of the screen 2 as shown in FIG. 3. The screen of this embodiment does not suffer from reflection of external lights by the screen surface, reduction of contrast and glare of displayed images.

For providing the anti-glare member on the surface of screen, for example, parts or whole surfaces of both the members may be adhered together with an adhesive, or both the members may be fixed with a frame. However, in order not to form an air layer between the anti-glare member and the screen surface, the whole surface of the anti-glare member is preferably adhered on the screen surface using an adhesive or the like.

EXAMPLES

Hereafter, the present invention will be further explained with reference to examples. The term and symbol "part" and "%" are used on the weight basis unless specifically indicated.

1. Synthesis of Black Resin Microparticles

Carbon black (complex index of refraction: 2.0+1.0i) was mixed with methyl methacrylate (index of refraction after polymerization: 1.49), and this mixture was uniformly kneaded with a roll mill. Subsequently, water, polyvinyl alcohol and a radical polymerization initiator (azobisisobutyronitrile) were added to the mixture, and the mixture was stirred with a high-speed stirrer (dissolver) until a mean particle diameter of the particles used in each of the examples and comparative examples was obtained. Then, the content was transferred to a container provided with a common vaned stirrer, and maintained at 65 to 75° C. for 50 minutes to perform the polymerization. Then, the slurry suspending the polymerization product was filtered, and the residue was washed with water and dried to obtain black resin microparticles.

Further, by changing mixing ratios of methyl methacrylate and carbon black and particle diameter of microparticles, various black resin microparticles used in the examples and comparative examples were prepared. In the following examples and comparative examples, the values of S (value obtained by dividing absorption cross section by scattering cross section) of the black microparticles in the transparent binder are values calculated for incident light having a wavelength λ of 550 nm.

2. Preparation of Anti-Glare Members

Anti-glare members of Examples 1 to 10 and anti-glare members of Comparative Examples 1 to 8 were prepared.

Example 1

On a transparent polyester film having a thickness of 100 μm (Lumirror T60, Toray Industries, Inc.), a coating solution for anti-glare layer having the following composition was applied in an amount giving a dry thickness of 2 μm and dried to form an anti-glare layer and thereby obtain an anti-glare member of Example 1. Ra of the anti-glare layer surface was 0.56 μm. Refractive index of the transparent binder of the anti-glare layer was 1.54, and n was 0.98.

| <Coating solution for anti-glare layer> | |
|---|---|
| Acrylic resin (ACRYDIC A807, Dainippon Ink & Chemicals Inc.. solid content: 50%) | 16.2 parts |
| Isocyanate type curing agent (Takenate D110N, Mitsui Takeda Chemicals, Inc., solid content: 60%) | 3.5 parts |
| Black resin microparticles (carbon black: 5% by weight, mean particle diameter: 3 μm, complex index of refraction: 1.52 + 0.05i, S: 1.59) | 4.0 parts |
| Dilution solvent | 30.0 parts |

Example 2

An anti-glare member of Example 2 was obtained in the same manner as that of Example 1 except that the amount of the black resin microparticles used in Example 1 was changed to 3.5 parts. Ra of the anti-glare layer surface was 0.47 μm, and n was 0.98.

Example 3

An anti-glare member of Example 3 was obtained in the same manner as that of Example 1 except that the amount of the black resin microparticles used in Example 1 was changed to 5.0 parts. Ra of the anti-glare layer surface was 0.71 μm, and n was 0.98.

Example 4

An anti-glare member of Example 4 was obtained in the same manner as that of Example 1 except that the amount of the black resin microparticles used in Example 1 was changed to 2.5 parts. Ra of the anti-glare layer surface was 0.32 μm, and n was 0.98.

Example 5

An anti-glare member of Example 5 was obtained in the same manner as that of Example 1 except that the amount of the black resin microparticles used in Example 1 was changed to 7.0 parts. Ra of the anti-glare layer surface was 0.97 μm, and n was 0.98.

Example 6

An anti-glare member of Example 6 was obtained in the same manner as that of Example 1 except that the mean particle diameter of the black resin microparticles in the coating solution for anti-glare layer used in Example 1 was changed to 1.4 μm (S became 2.98 because of the change of the mean particle diameter), and the amount of the black resin microparticles was changed to 7.0 parts. Ra of the anti-glare layer surface was 0.35 μm, and n was 0.98.

Example 7

An anti-glare member of Example 7 was obtained in the same manner as that of Example 1 except that the black resin microparticles in the coating solution for anti-glare layer used in Example 1 were changed to black resin microparticles (carbon black: 3% by weight, complex index of refraction: 1.51+0.03i, mean particle diameter: 2.9 μm, S: 1.34), and the amount of the black resin microparticles was changed to 5.0 parts. Ra of the anti-glare layer surface was 0.54 μm, and n was 0.98.

Example 8

An anti-glare member of Example 8 was obtained in the same manner as that of Example 1 except that the black resin microparticles in the coating solution for anti-glare layer used in Example 1 were changed to black resin microparticles (carbon black: 10% by weight, complex index of refraction: 1.54+0.10i, mean particle diameter: 2.8 μm, S: 1.35). Ra of the anti-glare layer surface was 0.54 μm, and n was 1.00.

Example 9

An anti-glare member of Example 9 was obtained in the same manner as that of Example 1 except that the black resin microparticles in the coating solution for anti-glare layer used in Example 1 were changed to black resin microparticles (carbon black: 15% by weight, complex index of refraction: 1.57+0.15i, mean particle diameter: 3.2 μm, S: 1.13). Ra of the anti-glare layer surface was 0.56 μm, and n was 1.02.

Example 10

An anti-glare member of Example 10 was obtained in the same manner as that of Example 1 except that the black resin microparticles in the coating solution for anti-glare layer used in Example 1 were changed to black resin microparticles (carbon black: 20% by weight, complex index of refraction: 1.59+0.20i, mean particle diameter: 2.0 μm, S: 1.18), and the amount of the black resin microparticles was changed to 3.0 parts. Ra of the anti-glare layer surface was 0.48 μm, and n was 1.04.

Comparative Example 1

An anti-glare member of Comparative Example 1 was obtained in the same manner as that of Example 1 except that the black resin microparticles in the coating solution for anti-glare layer used in Example 1 were changed to transparent resin microparticles (Chemisnow MX-300, Soken Chemical & Engineering Co., Ltd., mean particle diameter: 3.0 μm, index of refraction: 1.49, S: 0). Ra of the anti-glare layer surface was 0.59 μm, and n was 0.97.

Comparative Example 2

An anti-glare member of Comparative Example 2 was obtained in the same manner as that of Example 1 except that the black resin microparticles in the coating solution for anti-glare layer used in Example 1 were changed to transparent resin microparticles (Chemisnow MX-300, Soken Chemical & Engineering Co., Ltd., mean particle diameter: 3.0 μm, index of refraction: 1.49, S: 0), and the amount of the microparticles was changed to 7.0 parts. Ra of the anti-glare layer surface was 0.95 μm, and n was 0.97.

Comparative Example 3

An anti-glare member of Comparative Example 3 was obtained in the same manner as that of Example 1 except that the amount of the black resin microparticles in the coating solution for anti-glare layer used in Example 1 was changed to 1.0 part. Ra of the anti-glare layer surface was 0.18 μm, and n was 0.98.

Comparative Example 4

An anti-glare member of Comparative Example 4 was obtained in the same manner as that of Example 1 except that the black resin microparticles in the coating solution for anti-glare layer used in Example 1 were changed to those having a mean particle diameter of 5.5 μm (S became 1.16 because of the change of the mean particle diameter), and the amount of the microparticles was changed to 5.0 parts. Ra of the anti-glare layer surface was 1.21 μm, and n was 0.98.

Comparative Example 5

An anti-glare member of Comparative Example 5 was obtained in the same manner as that of Example 1 except that the black resin microparticles in the coating solution for anti-glare layer used in Example 1 were changed to black resin microparticles (carbon black: 5% by weight, complex index of refraction: 1.52+0.05i, mean particle diameter: 0.5 μm, S: 8.89). Ra of the anti-glare layer surface was 0.08 μm, and n was 0.98.

Comparative Example 6

An anti-glare member of Comparative Example 6 was obtained in the same manner as that of Example 1 except that the black resin microparticles in the coating solution for anti-glare layer used in Example 1 were changed to black resin microparticles (carbon black: 5% by weight, complex index of refraction: 1.52+0.05i, mean particle diameter: 8.0 μm, S: 1.05). Ra of the anti-glare layer surface was 1.33 μm, and n was 0.98.

Comparative Example 7

An anti-glare member of Comparative Example 7 was obtained in the same manner as that of Example 1 except that the black resin microparticles in the coating solution for anti-glare layer used in Example 1 were changed to black resin microparticles (carbon black: 25% by weight, complex index of refraction: 1.62+0.25i, mean particle diameter: 2.0 μm, S: 1.12). Ra of the anti-glare layer surface was 0.54 μm, and n was 1.06.

Comparative Example 8

An anti-glare member of Comparative Example 8 was obtained in the same manner as that of Example 1 except that, in the coating solution for anti-glare layer of Example 1, the isocyanate type curing agent was not used, the acrylic resin was changed to 10.2 parts of a styrene resin (Styron 666R, Asahi Chemical Industry Co., Ltd., index of refraction: 1.60, solid content: 100%), and the black resin microparticles were changed to black resin microparticles (carbon black: 3% by weight, complex index of refraction: 1.51+0.03i, mean particle diameter: 2.9 μm, S: 0.43). Ra of the anti-glare layer surface was 0.57 μm, and n was 0.94.

3. Evaluation

Each of the anti-glare members obtained in Examples 1 to 10 and Comparative Examples 1 to 8 was disposed on a surface of a transmission screen (DILAD Screen T90S, Kimoto Co., Ltd.), and the obtained screen was evaluated for the following items. As the projector for projection on the screen, ELP-8000 (product name, Seiko Epson Corporation) was used. The results are shown in Table 1.

(1) Reflection of External Lights

The results of no reflection of external lights are indicated with the symbol "⊚", those of a little reflection of external lights are indicated with the symbol "○", and those of significant reflection of external lights resulting in displayed images hard to see are indicated with the symbol "X".

(2) Contrast

Contrast was measured under an environment where illumination at the screen surface should be 500 lx. The contrast was evaluated as a ratio of brightness values of white display (bright display) and black display (dark display). The results of contrast not lower than 10 are indicated with the symbol "⊚", those not lower than 8 and lower than 10 are indicated with the symbol "○", and those lower than 8 are indicated with the symbol "X".

(3) Glare

The results of no glare are indicated with the symbol "⊚", those of a little glare are indicated with the symbol "○", and those of significant glare resulting in displayed images hard to see are indicated with the symbol "X".

TABLE 1

| | Reflection of external lights | Contrast | Glare | Ra | n | S |
|---|---|---|---|---|---|---|
| Example 1 | ⊚ | 12.0(⊚) | ⊚ | 0.56 | 0.98 | 1.59 |
| Example 2 | ⊚ | 11.6(⊚) | ⊚ | 0.47 | 0.98 | 1.59 |
| Example 3 | ⊚ | 12.5(⊚) | ⊚ | 0.71 | 0.98 | 1.59 |
| Example 4 | ○ | 10.5(⊚) | ⊚ | 0.32 | 0.98 | 1.59 |
| Example 5 | ⊚ | 9.5(○) | ⊚ | 0.97 | 0.98 | 1.59 |
| Example 6 | ○ | 12.6(⊚) | ⊚ | 0.35 | 0.98 | 2.98 |
| Example 7 | ⊚ | 10.2(⊚) | ⊚ | 0.54 | 0.98 | 1.34 |
| Example 8 | ⊚ | 12.0(⊚) | ⊚ | 0.54 | 1.00 | 1.35 |
| Example 9 | ⊚ | 8.8(○) | ○ | 0.56 | 1.02 | 1.13 |
| Example 10 | ⊚ | 8.6(○) | ○ | 0.48 | 1.04 | 1.18 |
| Comparative Example 1 | ⊚ | 4.2(X) | X | 0.59 | 0.97 | 0 |
| Comparative Example 2 | ⊚ | 4.2(X) | X | 0.95 | 0.97 | 0 |
| Comparative Example 3 | X | 7.3(X) | ⊚ | 0.18 | 0.98 | 1.59 |
| Comparative Example 4 | ⊚ | 5.0(X) | ○ | 1.21 | 0.98 | 1.16 |
| Comparative Example 5 | X | 8.4(○) | ⊚ | 0.08 | 0.98 | 8.89 |
| Comparative Example 6 | ⊚ | 5.1(X) | X | 1.33 | 0.98 | 1.05 |
| Comparative Example 7 | ⊚ | 4.1(X) | X | 0.54 | 1.06 | 1.12 |
| Comparative Example 8 | ⊚ | 9.4(○) | X | 0.57 | 0.94 | 0.43 |

The anti-glare members of Examples 1 to 10 which used black microparticles as the microparticles, and had n of 0.95 to 1.05, and Ra of the surface of the anti-glare layer of 0.3 to 1.0 μm showed good evaluation results for all the items, reflection of external lights, contrast and glare. In particular, those of Examples 1, 2, 3, 7 and 8 having Ra of the surface of an anti-glare layer in the range of 0.4 to 0.8 μm and S in the range of 1.3 to 2.0 showed extremely good performances for reflection of external lights, contrast and glare.

When the anti-glare members of Examples 1 to 10 were disposed on surfaces of liquid crystal displays, they showed good evaluation results for all the items, reflection of external lights, contrast and glare.

The anti-glare members of Comparative Examples 1 and 2 did not utilize black microparticles, although they had Ra of 0.3 to 1.0 μm, and they could not give satisfactory results for contrast and glare.

The anti-glare members of Comparative Examples 3 to 6 did not have Ra of 0.3 to 1.0 μm, although they utilized black microparticles, and they could not simultaneously give satisfactory results for all the items, reflection of external lights, contrast and glare.

The anti-glare members of Comparative Examples 7 and 8 had a value of n out of the range of 0.95 to 1.05, although they utilized black microparticles, and had Ra of the surface of the anti-glare layer of 0.3 to 1.0 μm. Bad influence was observed on contrast and glare with them.

EXPLANATIONS OF NUMERALS

Figure 1:
FIG. 1 A sectional view showing an embodiment of the anti-glare member of the present invention.
Figure 2:
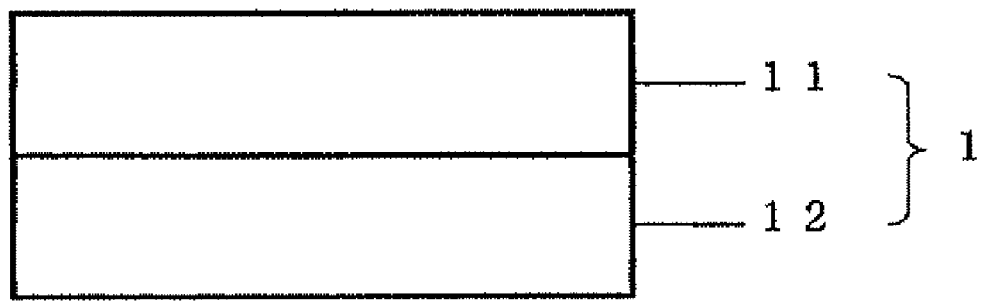
FIG. 2 A sectional view showing another embodiment of the anti-glare member of the present invention.
Figure 3:
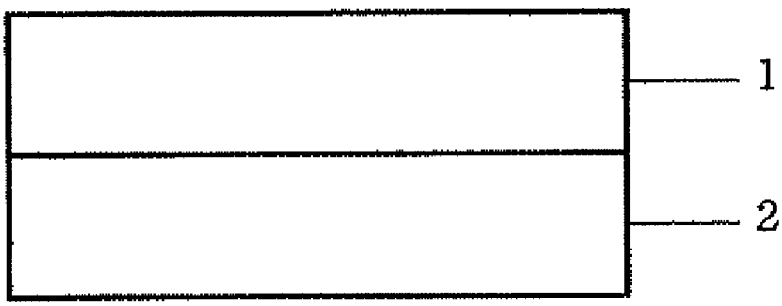
FIG. 3 A sectional view showing an embodiment of the display or screen of the present invention.

| | |
|---|---|
| 1 | Anti-glare member |
| 11 | Anti-glare layer |
| 12 | Transparent support |
| 2 | Display or screen |

The invention claimed is:

1. An anti-glare member having an anti-glare layer comprising microparticles and a transparent binder, wherein:
    the microparticles are black microparticles,
    a value (n) obtained by dividing absolute value of complex index of refraction of the black microparticles by index of refraction of the transparent binder is 0.95 to 1.05,
    arithmetical mean roughness (Ra) according to JIS B0601: 2001 of surface of the anti-glare layer is 0.4 to 1.0 μm, and
    the black microparticles are black resin microparticles comprising at least a black pigment and a resin, and the black pigment is 2 to 20% by weight of the black microparticles.

2. The anti-glare member according to claim 1, wherein:
    the black microparticles have a mean particle diameter of 1.0 to 6.0 μm.

3. The anti-glare member according to claim 1, wherein:
    a value (S) obtained by dividing absorption cross section of the black microparticles by scattering cross section of the same is 1.1 to 5.0.

4. The anti-glare member according to claim 1, wherein the black pigment of the black resin microparticles is carbon black.

5. The anti-glare member according to claim 1, wherein:
    content of the black microparticles is 20 to 100 parts by weight with respect to 100 parts by weight of the transparent binder.

6. A display having the anti-glare member according to claim 1 on a surface of the display.

7. A screen having the anti-glare member according to any one of claims 1 to 5 on a surface of the screen.

8. The screen according to claim 7, wherein the anti-glare layer is the outermost layer of the anti-glare member.

9. The display according to claim 6, wherein the anti-glare layer is the outermost layer of the anti-glare member.

* * * * *